Figure 1:
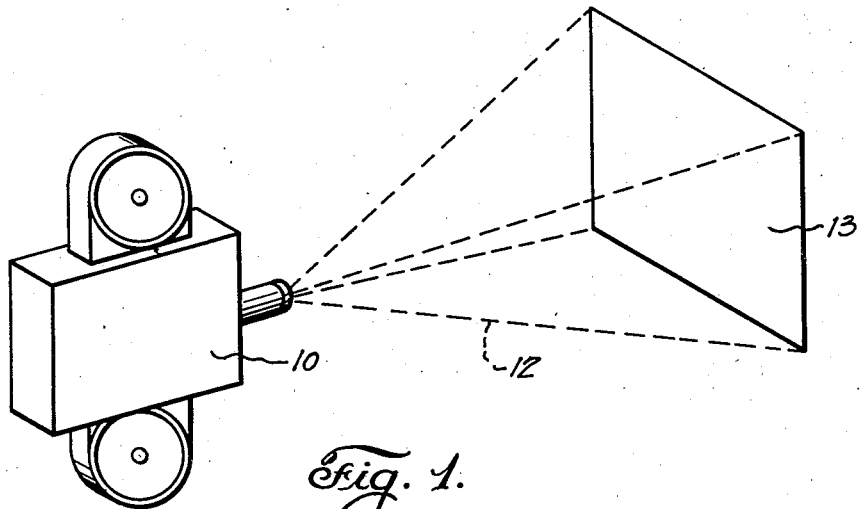

Jan. 13, 1942.  R. J. ERWIN  2,269,713
SHUTTER FOR PROJECTION APPARATUS
Filed Sept. 9, 1939   2 Sheets-Sheet 1

Inventor
Ralph J. Erwin
By Jack A. Ashley
Attorney

Jan. 13, 1942.  R. J. ERWIN  2,269,713
SHUTTER FOR PROJECTION APPARATUS
Filed Sept. 9, 1939    2 Sheets-Sheet 2

Inventor
Ralph J. Erwin
By
Attorney

Patented Jan. 13, 1942

2,269,713

UNITED STATES PATENT OFFICE 2,269,713

SHUTTER FOR PROJECTION APPARATUS

Ralph J. Erwin, Ballinger, Tex.

Application September 9, 1939, Serial No. 294,164

3 Claims. (Cl. 88—19.3)

This invention relates to new and useful improvements in shutters for projection apparatus.

One object of the invention is to provide an improved shutter which is particularly adapted for use with motion picture projecting machines and which is readily applicable to the standard type of machine now in general use without materially changing the construction thereof.

An important object of the invention is to provide an improved shutter for projection apparatus which is constructed so that the light projecting onto a screen from said apparatus is controlled so as to undergo a more or less gradual change from maximum intensity to complete darkness, and vice versa, rather than an abrupt change from one to the other as occurs in the present type of shutter; this arrangement making it possible to maintain light on the screen for a maximum length of time without danger of "flicker" or other annoyance and also providing for a smoother visual observation since the observer's eye is not subjected to a sudden and abrupt change from intense light to complete darkness.

Another object of the invention is to provide an improved shutter for motion film projecting apparatus which is so constructed that the projected light beam is initially intercepted at its central portion after which the remainder of said beam is intercepted to totally darken the receiving screen, whereby the outer edge portions of the beam remain projected on the screen for an increased length of time and after the central portion of the beam has been intercepted, thus reducing the contrast between the center of the projected image and the outer edges thereof and thereby eliminating the difficulty, generally known as a "hot spot" which results from the center of the image receiving the most light, with the outer edge portions thereof receiving insufficient light.

A further object of the invention is to provide an improved shutter which intercepts or completely cuts off the projected light beam only for the period required to move the frames of the film passing through the projection apparatus, whereby the maximum amount of light from the light source is utilized and more efficient projection is obtained.

A particular object of the invention is to provide an improved shutter, of the character described, wherein a pair of shutter elements are arranged to co-act with each other in such manner as to intercept the projected light beam; said elements being of such material that one or the other alone is not capable of completely intercepting said beam, whereby both must co-act to effect such interception.

Still another object of the invention is to provide an improved shutter for motion film projection wherein the shutter elements are constructed of polarizing material, with the polarizing effect of one element being opposite the polarizing effect of the other, whereby the elements must co-act with each other in order to completely intercept the light beam; each element being capable, by itself, of partially intercepting or dimming said beam.

A further object of the invention is to provide an improved shutter having a pair of shutter blades which are arranged to be mounted on a single shaft so that said blades are rotated in the same direction, the blades being associated with the projection lenses of the camera in such manner that both blades act upon the projected light beam as a whole; said blades being constructed so as to produce the effect of oppositely rotating blades.

A construction designed to carry out the invention will be hereinafter described, together with other features of the invention.

Figures 2, 3:
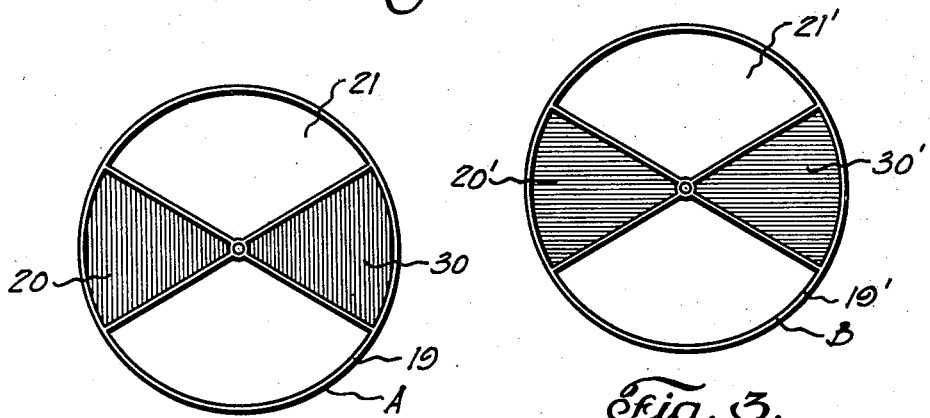
Figure 4:
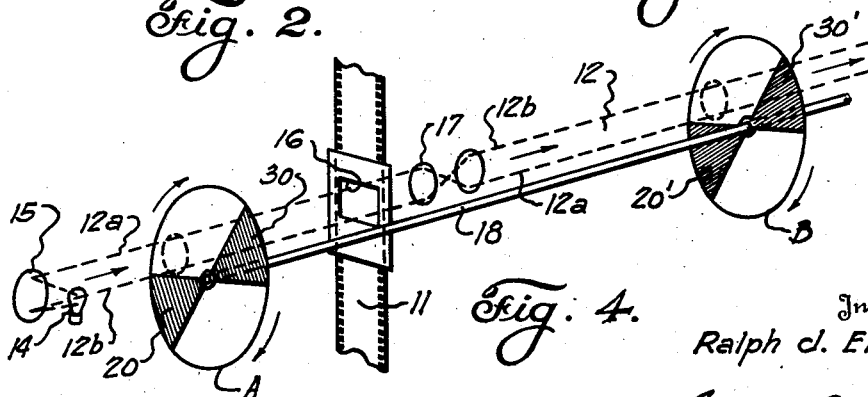

The invention will be more readily understood from a reading of the following specification and by reference to the accompanying drawings, in which an example of the invention is shown, and wherein:

Figure 1 is an isometric view of an ordinary motion film projector and screen,

Figure 2 is an elevation of one of the shutter elements, constructed in accordance with the invention, Figure 3 is an elevation of the other shutter element, Figure 4 is a view illustrating the shutter elements mounted in the projector, the latter being shown schematically, and Figures 5 to 9 are views illustrating the apparent successive positions of the shutter elements as they act upon the light beam during operation of the projector.

In the drawings, the numeral 10 designates a motion picture projector which may be of any suitable construction. The projector has means for intermittently moving the film 11 therethrough and a light beam 12, indicated by dotted lines in Figures 1 and 4, is projected through the film and onto a screen 13 in the usual manner, whereby the image is visible on said screen. As is well known, the film includes a plurality of frames and each time the film is moved, the next frame is alined with the optical system of the projector. During the movement of the film to present the successive frames of the film, the light beam 12 is intercepted, whereby the screen is darkened during said movement. Of course, the period of interception is of such short duration that it is not visible to the person observing the screen.

As stated, the projector 10 may be of any desired construction and has been illustrated schematically in Figure 4. The projector includes a light source 14 and a reflector 15 which focuses the beam of light 12 through an aperture 16, and the film 11 is adapted to travel over this aperture, whereby said light beam passes therethrough. The beam of light is substantially circular in cross-section and after passing through the film travels to the optical system of the projector, which includes the conveying lenses 17. The lenses 17 reverse or invert the light beam 12, whereby the image which is inverted or the film 11 appears in its correct position on the screen 13. The inverted beam of light maintains its same shape, which is substantially circular in cross-section until it leaves the projector. This arrangement for the projection of the image onto the screen is standard in motion picture projectors and forms no part of the present invention, being subject to variation.

Each time that the film 11 is moved to bring the next frame or image into alinement with the aperture 16, it is necessary that the light beam 12 be intercepted so as to darken the screen 13 during the travel of the film. For this purpose, the improved shutter arrangement, herein illustrated and described, is employed. The shutter includes a shutter element A which is mounted on one end of a longitudinal shaft 18. The shaft is rotated by any suitable means (not shown) which is synchronized with the actuating mechanism for the film 11, whereby the shaft is rotated at a speed in accordance with the actuation or movement of the film through the projector. The shutter element A is disposed in a vertical plane between the light source 14 and the aperture 16, while the shaft 18, on which said element is mounted, is in a horizontal plane below the projected light beam 12.

The element A includes a circular frame 19 which has a pair of shutter blades 20 and 30 mounted therein, as is clearly shown in Figure 2. The blades are constructed in the same manner and each has a general triangular shape, with the apex of the triangle located at the center of the frame. The blades are diametrically opposite each other and are constructed of gelatin, glass or other transparent or semi-transparent material. The material of which the blades are constructed has a polarizing effect which is indicated by the spaced vertical lines, shown in the drawings. It is noted that the polarizing effect of both the blades 20 and 30 is substantially the same, that is, the polarizing effect of the blade 20 is parallel to that of the blade 30. Since the blades are mounted within the circular frame 19 and are disposed diametrically opposite each other, arcuate spaces or apertures 21 are formed between said blades within said frame.

Due to the interposition of the element A between the light source 14 and the film 11 and also due to the position of the shaft 18 which carries said element, it will be obvious that the light beam 12 is arranged to be intercepted by the rotating blades 20 and 30 of said element. When the openings 21 of the shutter element are alined with the beam, the full intensity of the light beam is directed through the aperture 16 and film 11. However, when either of the polarizing blades 20 and 30 are alined with or intercepting the beam, only a portion of the light rays 12 can pass through the blades, whereby a beam of less intensity travels through the aperture 16. The disposition of the blades 20 and 30 within the frame 19, together with the rotation of said frames causes an alternate direct and intercepted beam of light to be directed onto the film.

A second shutter element B is mounted on the opposite end of the rotating shaft 18 and is constructed in substantially the same manner as the element A. This element includes a frame 19' and blades 20' and 30', with openings 21' located between the blades and is actually a duplicate of the element A, except for the polarizing effect of the material of which the blades 20' and 30' are constructed. The polarizing effect of the blades 20' and 30' is at a right angle or opposite to the polarizing effect of the blades 20 and 30, as is indicated by the horizontal lines illustrated on the drawings. As in the case of the blades 20 and 30, the blades 20' and 30' will pass a portion of the light rays of the beam 12 therethrough. Since the polarizing effect of the blades 20' and 30' is opposite to the polarizing effect of the blades 20 and 30, it will be manifest that when a light beam is directed through the blade 20 of the element A and then through the blade 20' of the element B, said beam will be substantially totally intercepted, each blade acting to intercept a portion of the rays. Similarly, the projection of a beam through the blade 30 of the element A and the blade 30' of the element B will result in a complete interception of said beam. The element B is mounted on the shaft 18 in the same relative position as the element A, whereby the blade 20' of the element B is horizontally alined with the blade 20 of the element A and the blade 30' is alined with the blade 30. Manifestly, since both elements are mounted on the same shaft 18 and are rotated simultaneously, the blades of one remain alined at all times with the blades of the other.

In operation, assuming the parts to be in the position shown in Figure 4, the light beam 12 is projected from the light source and passes through one of the openings 21 in the element A and then through the aperture 16 and film 11. The light beam then passes through the converging lenses 17, which lenses invert or reverse said beam, after which the beam is directed through one of the openings 21' of the element B and onto the screen 13 to make the image visible thereon. To more clearly explain the action of the shutter, the beam 12 has been defined by an upper dotted line 12a and a lower dotted line 12b, which lines represent the top and bottom of the beam.

With the shaft 18 rotating in the direction of the arrows in Figure 4, it will be seen that the shutter blade 20 of the element A begins to intercept the bottom half of the light beam. As soon as the edge portion of said blade moves into alinement with the beam, a portion of the light rays are immediately cut out, due to the polarizing effect of the material of which the blade is constructed. However, as explained, the blade 20 alone is not sufficient to totally intercept substantially all of the light rays so as to substantially cut off the projection of the beam onto the film.

The blade 20' of the second shutter element B is in horizontal alinement with the blade 20 of the element A and as soon as the blade 20 begins to intercept the beam 12, the blade 20' also moves into the path of the beam. As explained, the blade of the element A first intercepts the lower portion of the beam, as represented by line 12b, and although the blade 20' of the element B is alined with said blade 20, the blade 20' does not intercept the lower portion of the beam, but rather initially intercepts the upper portion of said beam, as represented by the line 12a. This is true because the lenses 17 invert or reverse the beam, as is clearly illustrated in Figure 4. As the blade 20' moves into the path of the beam, it acts to cut out some of the light rays but, of itself, does not intercept the beam so as to darken the screen.

Figure 5:
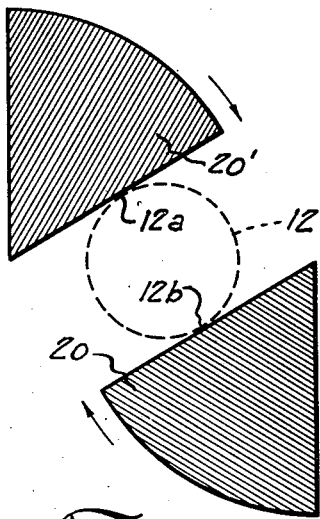
Figure 6:
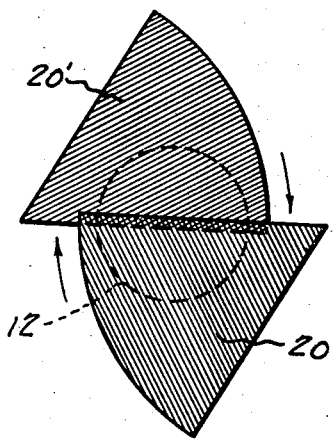

From the foregoing, it will be seen that the blade 20 of the element A initially intercepts the bottom portion of the beam 12, while the blade 20' initially intercepts the top portion of said beam. Obviously, both blades move inwardly toward the center of the beam. In explaining the action of the two blades 20 and 20' on the beam 12, reference is made to Figures 5 to 9. In Figure 5, the blades 20 and 20' are in the position corresponding to Figure 4, the edges of said blades being in close proximity to the beam. As the shaft 18 rotates, the blades 20 and 20' move inwardly toward the center of the beam and, in effect, cover the beam as illustrated in Figure 6. In this position, certain of the light rays are cut out by the polarizing effect of the blade 20, while other rays are cut out by the polarizing effect of the blade 20', whereby at this time the intensity of the light beam has been reduced but is still sufficient to project the image.

Continued rotation of the shaft moves the blades 20 and 20' past the center of the beam and since each is acting on opposite sides of said beam, the effect of overlapping the blades, as illustrated in Figure 6, is produced. As soon as the blades move past the center of the beam, or in effect overlap, it will be manifest that the light rays at the point of overlap of the blades must pass through both blades. Since the polarizing effect of the blade 20 is at a right angle or opposite the polarizing effect of the blade 20', it is obvious that the two blades co-act to substantially intercept all of the light rays and prevent the passage of said rays therethrough. It is noted that the blades first overlap at the central portion of the beam, whereby the light rays at this point are the first to be intercepted.

Figure 7:
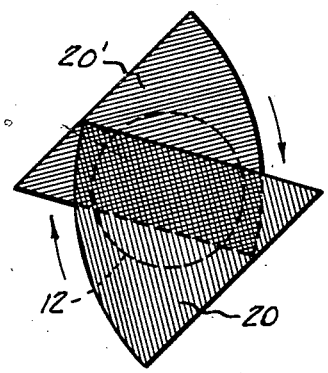
Figure 8:
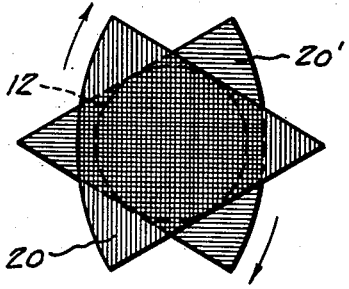

As the blades continue to revolve around the axis of the shaft 18, they continue to traverse more of the light beam 12, with the result that an increased overlapping effect of the blades is produced, as is illustrated in Figure 7. By observing this figure, it will be seen that the greater portion of the light rays of the beam are intercepted and prevented from passing, the only rays being permitted to pass being those at the outer edge portion of the beam. Continued rotation of the shaft 18 moves the blades into direct alinement with the light beam 12, whereby, in effect, a complete overlapping of the blades is produced, as is shown in Figure 8. In this position of the blades, the entire light beam is intercepted and substantially no light is projected onto the screen.

Figure 9:
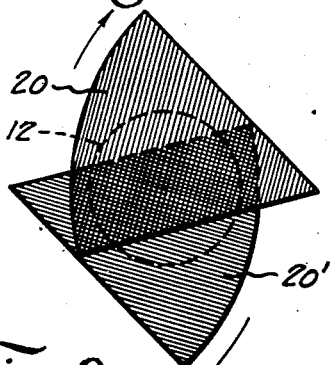

After the complete interception of the light beam, the blades 20 and 20' move out of alinement with the beam, and, in effect, move out of overlapping relation with each other, as is illustrated in Figure 9. As the blades move out of overlapping relation, the outer edge portions of the light beam 12 are first uncovered, whereby the light rays from these portions are directed onto the screen. Continued movement of the blades causes them to return to the position shown in Figure 5, whereby the beam is again projected onto the screen.

Just prior to the time that the blades assume the working position illustrated in Figure 8, the intermittent means (not shown), which operates the film 11, is actuated, whereby the film is moved so as to bring the next successive frame into alinement with the opening 16, while the blades 20 and 20' are completely intercepting the light beam. By the time that the blades begin to move out of overlapping arrangement, the frames on the film have been shifted. Thus, it will be seen that during the time that the film is moving, substantially all of the light is shut off from the screen 13.

As the shaft 18 continues to rotate, the blades 30 and 30' are moved into the path of the light beam 12 and will act in the same manner as the blades 20 and 20'. Therefore, upon each complete rotation of the shaft, the light beam is completely intercepted twice, first by the blades 20 and 20' and then by the blades 30 and 30'. It is noted, however, that the film is moved only once during one revolution of the shaft, one set of blades acting as "dummy blades" with no movement of the film during their interception of the beam.

By providing shutter blades constructed of a polarizing material, a portion of the light rays are intercepted so as to reduce the intensity of the light beam. Since the blades, in effect, begin to overlap at the central portion of the beam (Figure 6), the light rays at the center are first cut out, after which the light rays at the outer edge portions of the beam are totally intercepted. By darkening the center of the beam first, the outer edge portions of the image remain lighted for a maximum length of time, so that the contrast between the center of the projected image and the outer edges thereof is reduced, thereby eliminating the difficulty generally known as "hot spot." A "hot spot" results from the center of the image receiving too much light with the outer edge portions thereof receiving insufficient light. After the beam has been completely intercepted, the light rays from the outer edge portion of the beam are permitted to pass to the screen prior to the rays from the central portion of the beam, whereby sufficient light for the outer portions of the image is assured. In addition to darkening the screen from the center toward the outer edges thereof, the arrangement provides for more or less gradual reduction of light intensity. This is true because when the blades first move over the beam and prior to their overlapping, they cut down some of the light rays. Therefore, there is not an abrupt and sudden change from intense light to complete darkness, as occurs in the heretofore ordinary type of shutter. Further, light is continuously projected on the screen except for the single instant when the blades are in complete overlapping arrangement, as shown in Figure 8, with the result that "flicker" is substantially eliminated.

If desired, the polarizing material of which the blades are constructed may be tinted, colored, or smoked, so as to further reduce the light rays which can pass through either blade. When so tinted, the light beam is apparently interrupted but the tinted image of the film is still projected upon the screen. The shutter blades may be sufficiently wide to make the intervals between light and darkness on the screen nearly equal, whereby eye strain is reduced to a minimum. The wider shutter blade with its darkly tinted color cuts off enough light to reduce "flicker" to a minimum. Although any color may be employed in tinting the blades, it has been found that blue is most desirable since it adds tone to the projected picture. As above stated, the maximum amount of light which passes through the film is utilized, whereby the light output of the projector is increased.

It is pointed out that although the shutter blades have been shown and described as secured to a common shaft and rotated in the same direction, they could be arranged to revolve in opposite directions in close mechanical proximity, whereby said shutters would actually and mechanically act in the manner illustrated in Figures 5 to 9. The material of which the blades are constructed is preferably a polarizing material, such as glass or gelatin, but it is pointed out that any suitable material may be employed. In some instances, it might be possible to make the blades of a material other than one having polarizing effects. For example, it might be possible to tint the blades to an extent where the two blades, when in overlapping relation, will shut out sufficient light; so long as the blades are so constructed that either one or the other will not, of itself, totally intercept the beam, but when co-acting with the other will satisfactorily accomplish this purpose, the invention may be carried out. It is noted that substantially the same result may be obtained by using shutters having an increased number of blades in excess of two, as illustrated.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. In a projection apparatus utilizing a light beam, shutter means comprising a pair of coacting blade members constructed of a characteristic light-penetrable polarizing material with the polarizing effect of one member opposite to that of the other member, said blade members being located the one in a plane in advance of the plane of the other and, normally, both laterally out of range of the light beam but being each of a size to substantially cover the beam transversely thereof and movably mounted with positive operating provision for actuating them simultaneously and in fixed co-operative relation to each other, whereby to traverse the beam so that, during such actuation, the leading edge of one blade member enters the light beam from one side thereof while the leading edge of the other blade member enters the beam from its opposite side, said edges of the blades meeting diametrically at the center of the beam, the blade members thence continuing to traverse the beam in overlapped relation until their trailing edges part diametrically at the center of the beam, and each blade member in further continuation of actuation leaving the beam at the side thereof opposite to that at which the leading edge of the blade member entered the beam, whereby, until culmination of overlap in the coaction of the blade members, and during recession therefrom, partial obscuration of varying density in the light beam is effected, but at the time of substantially full overlap of the blade members across the beam substantially complete obscuration is attained.

2. In a projection apparatus utilizing a light beam, shutter means comprising a pair of coacting blade members constructed of a characteristic light-penetrable polarizing material with the polarizing effect of one member opposite to that of the other member, said blade members being located the one in a plane in advance of the plane of other, each of segmental form and dimensions to substantially cover the light beam transversely thereof and being mounted rotatably about an axis which is parallel with the longitudinal axis of the light beam but laterally out of the range of the beam, said blade members being positioned in a fixed correlation to each other and correspondingly radial with respect to rotative axis and having positive operating provision for rotating them simultaneously in such fixed co-operative relation to each other so that each blade member during rotation traverses the light beam, the leading edges of the blade members entering the beam from opposite sides thereof, meeting diametrically at the center of the beam, the blade members thence continuing to traverse the beam in overlapped relation until their trailing edges part diametrically at the center of the beam, and each blade member in further continuation of rotation leaving the beam at the side thereof opposite to that at which the leading edge of the blade member entered the beam, whereby, until culmination of overlap in the coaction of the blade members, and during recession therefrom, partial obscuration of varying density in the light beam is effected, but at the time of substantially full overlap of the blade members across the beam substantially complete obscuration is attained.

3. In a projection apparatus utilizing a light beam having a reversing lens system incorporated therein, shutter means comprising a rotatable shaft extending parallel with the longitudinal axis of the beam and laterally out of range of the beam, a pair of segmental blade members located the one in a plane in the rear of the reversing lens system and the other in a plane in front of said system, said blade members being of duplicate segmental form and of a size for either to substantially cover the light beam transversely thereof, and both fixedly mounted on said rotatable shaft and extending radially from the shaft in constant, fixedly alined, registration with each other, whereby, upon rotation of the before mentioned shaft, said blade members simultaneously traverse the light beam and, due to the beam-reversing effect of said incorporated lens system, said blade members having the apparent effect of entering the beam from opposite sides thereof, with their leading edges meeting diametrically at the center of the beam and the members thence continuing to traverse the beam in overlapped relation until their trailing edges part diametrically at the center of the beam, and said blade members in further continuation of their fixedly correlated rotation having the apparent effect of each member leaving the beam from the side opposite to that at which the member entered the beam, said blade members being constructed of a characteristic light-penetrable polarizing material with the polarizing effect of one member opopsite to that of the other member, whereby, in the coactive traversing of the light beam by said blade members, until culmination of overlap of the members, and during recession therefrom, partil obscuration of varying density in the light beam is effected, but at the time of substantially full overlap of the blade members across the beam substantially complete obscuration is attained.

RALPH J. ERWIN.